(12) United States Patent  
Bussom et al.

(10) Patent No.: US 7,757,992 B2  
(45) Date of Patent: Jul. 20, 2010

(54) SYSTEM AND METHOD FOR IMPROVED ROTOR TIP PERFORMANCE

(75) Inventors: Richard Bussom, West Chester, PA (US); Michael A. McVeigh, Media, PA (US); Robert P. Narducci, Glen Mills, PA (US); Thomas A. Zientek, Drexel Hill, PA (US)

(73) Assignee: The Boeing Company, Chicago, IL (US)

( * ) Notice: Subject to any disclaimer, the term of this patent is extended or adjusted under 35 U.S.C. 154(b) by 693 days.

(21) Appl. No.: 11/752,791

(22) Filed: May 23, 2007

(65) Prior Publication Data

US 2010/0012770 A1    Jan. 21, 2010

Related U.S. Application Data

(62) Division of application No. 10/898,698, filed on Jul. 23, 2004, now Pat. No. 7,264,200.

(51) Int. Cl.
   *B64C 27/467* (2006.01)
(52) U.S. Cl. ............. 244/17.25; 416/24; 244/17.11
(58) Field of Classification Search .......... 244/17.11, 244/17.13, 17.25; 416/24, 87, 89, 238, 210 R, 416/210 A See application file for complete search history.

(56) References Cited

U.S. PATENT DOCUMENTS

| 4,172,574 | A | 10/1979 | Spillman |
| 4,247,063 | A | 1/1981 | Jenkins |
| 4,272,043 | A | 6/1981 | Spillman |
| 4,595,160 | A | 6/1986 | Santos |
| 4,671,473 | A | 6/1987 | Goodson |
| 4,722,499 | A | 2/1988 | Klug |
| 5,275,358 | A | 1/1994 | Goldhammer et al. |

(Continued)

FOREIGN PATENT DOCUMENTS

EP    1127786 A1    8/2001

(Continued)

OTHER PUBLICATIONS

Boyd, Jr. "The Effect of Blade Tip Vanes of Helicopter Rotor Performance," Aeronautical Systems Division, Wright-Patterson Air Force Base, Ohio Aug. 19, 1983 pp. 1-4.

(Continued)

*Primary Examiner*—Timothy D Collins  
(74) *Attorney, Agent, or Firm*—Lee & Hayes, PLLC (57) ABSTRACT

Embodiments of systems and methods for enhancing the performance of rotary wing aircraft through reduced torque, noise and vibration are disclosed. In one embodiment, a method includes configuring the rotorcraft in a selected flight condition, communicating input signals to a control system operable to position sails coupled to tips of blades of a rotor assembly, processing the input signals according to a constraint condition to generate sail positional information, and transferring the sail positional information to the sail. Alternately, input signals may be communicated to a control system operable to position a plurality of sails, each sail having an aerodynamic shape and positioned proximate to a tip portion of the rotor blade. The input signals may be configured to rotate each sail about a longitudinal axis into a corresponding pitch angle independently of the other sails.

15 Claims, 6 Drawing Sheets

U.S. PATENT DOCUMENTS

| | | | |
|---|---|---|---|
| 5,823,480 | A | 10/1998 | La Roche |
| 5,988,563 | A | 11/1999 | Allen |
| 6,227,487 | B1 | 5/2001 | Clark |
| 6,345,790 | B1 | 2/2002 | Brix |
| 6,394,397 | B1 | 5/2002 | Ngo et al. |
| 6,431,499 | B1 | 8/2002 | La Roche et al. |
| 6,467,732 | B2 * | 10/2002 | Tsukahara et al. ....... 244/199.4 |
| 6,545,384 | B1 | 4/2003 | Pelrine et al. |
| 7,384,016 | B2 * | 6/2008 | Kota et al. ............... 244/123.1 |
| 2002/0066831 | A1 | 6/2002 | Ngo et al. |

FOREIGN PATENT DOCUMENTS

| | | | |
|---|---|---|---|
| EP | | 1428752 A1 | 6/2004 |

OTHER PUBLICATIONS

Haeffele, "An Investigation of Rotor Tip-Vortex Drag Reduction Using Tip Vanes," Department of Aerospace Engineering Georgia Institute of Technology, Apr. 23-24, 1981 Orlando, Florida pp. 1-28.

Jarvis et al., "Investigation of Aerodynamic Improvements Using Wing Tip Sails," 37th AIAA Aerospace Sciences Meeting and Exhibit, Jan. 11-14, 1999, Reno, NV pp. 1-12.

Patterson III, "An Investigation of Rotor Blade Tip Shapes and Their Effects on Thrust and Torque," School of Aerospace Engineering Georgia Institue of Technology, Sep. 3, 1981, Atlanta, Georgia pp. 1-17.

Zientek et al., "Rotorcraft Noise Reduction and Performance Enhancement," Rotorcraft Industrial Technology Association (RITA) BVWT0433 V-22 Segmented Blade Test 2002 pp. 1-26.

* cited by examiner

SYSTEM AND METHOD FOR IMPROVED ROTOR TIP PERFORMANCE

CROSS-REFERENCE TO RELATED APPLICATIONS

This patent application is a divisional application of co-pending, commonly-owned U.S. patent application Ser. No. 10/898,698 entitled "System and Method for Improved Rotor Tip Performance" filed on Jul. 23, 2004, which application is incorporated herein by reference.

GOVERNMENT LICENSE RIGHTS

The invention described herein was made in the performance of work under NASA Contract No. NCC2-9019 and is subject to the provisions of Section 305 of the National Aeronautics and Space Act of 1958 (72 Stat. 435; 42 U.S.C. §2457).

FIELD OF THE INVENTION

This invention relates generally to rotary wing aircraft, and more particularly to apparatus and methods for the performance enhancement of rotary wing aircraft.

BACKGROUND OF THE INVENTION

It is well known that rotary wing aircraft are capable of flight in a vertical direction as well as forwardly or backwardly in horizontal flight, and may further remain stationary while aloft. Examples of rotary wing aircraft correspondingly include helicopters and tilt-rotor aircraft, among others. In all of these flight vehicles, thrust is generated by one or more rotor assemblies having aerodynamically-shaped blades that are constantly in rotational motion relative to the flight vehicle. The generated thrust may be used to lift and/or propel the rotorcraft in a lateral direction. Due to pressure differences that exist between an upper surface of the blade and a lower surface while the blade is in motion, vortices are generated at the tips of the blades that produce various undesirable effects.

One notable effect is an increase in drag on the blades of the one or more rotor assemblies, particularly while the rotary wing aircraft is stationary, or hovering. Consequently, an engine that drives the one or more rotor assemblies must develop additional torque to overcome the pressure drag generated by the tip vortices, resulting in higher fuel consumption for the rotary wing aircraft. Further, since the tips of the blades generally operate at relatively high subsonic local Mach numbers (typically between M=0.6 to 0.95), an increase in compressibility drag may occur that is due to shock wave drag or shock-induced flow separation, particularly on an advancing blade tip when the vehicle is in forward motion.

Another undesirable effect of the tip vortices is the generation of noise and impulsive changes in aerodynamic loads on the blades. In particular, the interaction of vortices shed from a blade tip and a following blade, and/or the interaction of the tip vortices with the fuselage or empennage structures of the rotary wing aircraft, result in a phenomenon known as blade-vortex interaction (BVI), which may be particularly severe when the blades are relatively heavily loaded, such as during a low-speed descent to landing, or during the execution of certain flight maneuvers. Since BVI generates elevated vibration levels in various components comprising the rotary wing aircraft, the useful life of such components is typically shortened. Additionally, occupants in the rotary wing aircraft may experience the unpleasant effects of the elevated vibration levels generated by BVI.

Various prior art devices have been employed in an attempt to address the foregoing undesirable effects. For example, rotor blade tips have been configured with a sweep back angle, or with a localized span-wise twist. Still other prior art attempts have utilized improved airfoil cross-sections for the rotor blade, or have employed tips having a negative dihedral angle. The foregoing devices are generally effective under a specific flight condition, and are relatively less effective under other different flight conditions.

Therefore, a need exists for improved apparatus and methods that mitigate the undesirable effects of tip vortices more effectively and over a greater range of flight conditions than achieved by the prior art.

SUMMARY OF THE INVENTION

Embodiments of systems and methods in accordance with the present disclosure are configured for the performance enhancement of rotary wing aircraft. In one aspect, a method of operating a rotorcraft includes configuring the rotorcraft in a selected flight condition, communicating input signals to a control system operable to position sails coupled to the tips of the blades of a rotor assembly, processing the input signals according to a constraint condition to generate sail positional information, and transferring the sail positional information to the sail.

The features, functions, and advantages that have been above or will be discussed below can be achieved independently in various embodiments, or may be combined in yet other embodiments, further details of which can be seen with reference to the following description and drawings.

BRIEF DESCRIPTION OF THE DRAWINGS

Embodiments of the present invention are described in detail below with reference to the following drawings.

DETAILED DESCRIPTION OF THE INVENTION

Embodiments of apparatus and methods in accordance with the teachings of the present disclosure enhance the performance of rotary wing aircraft. Many specific details of certain embodiments of the invention are set forth in the following description and in FIGS. 1 through 6 to provide a thorough understanding of such embodiments. One skilled in the art, however, will understand that the present invention may have additional embodiments, or that the present invention may be practiced without several of the details described in the following description.

Figure 1:
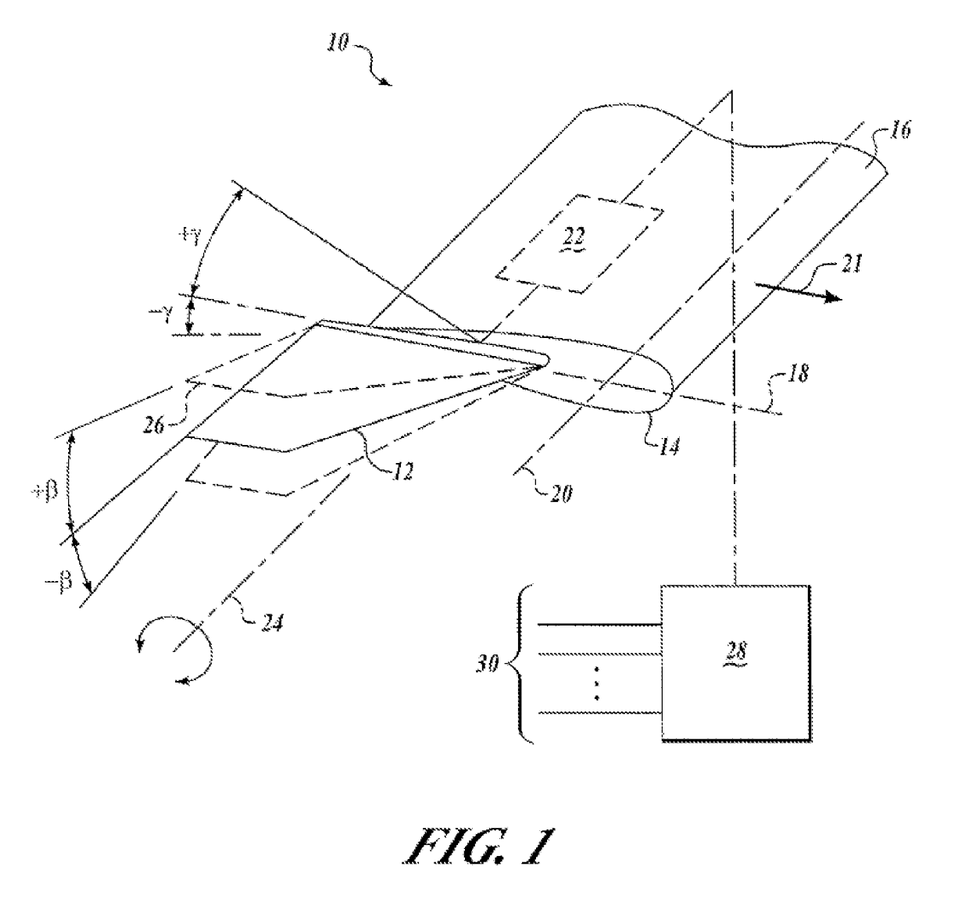
FIG. 1 is a block diagrammatic, partial isometric view of a system for improved rotor tip performance according to an embodiment of the invention.
Figure 2A:
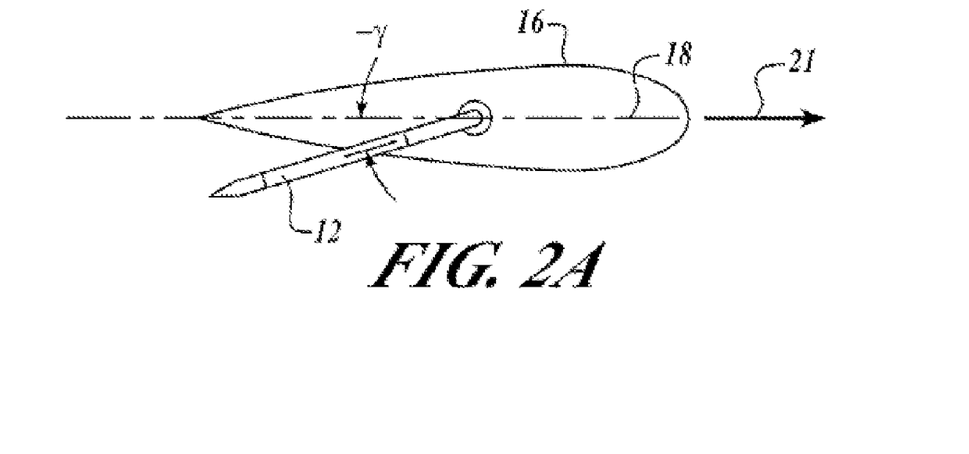
FIGS. 2(a) through 2(c) are partial side views of the system of FIG. 1 that show the sail oriented at selected pitch angles.
Figure 2B:
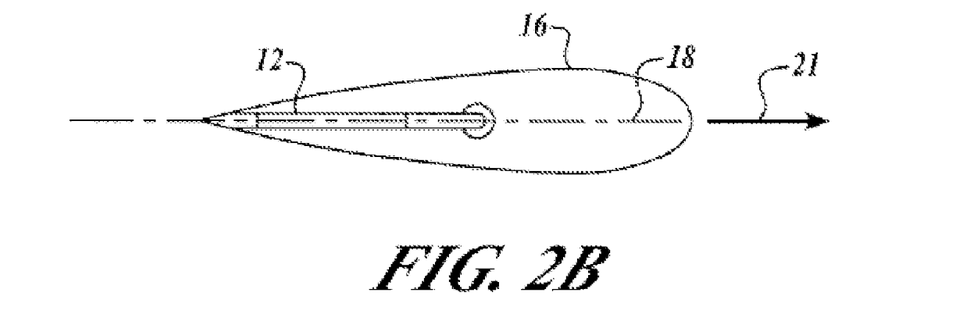
Figure 2C:
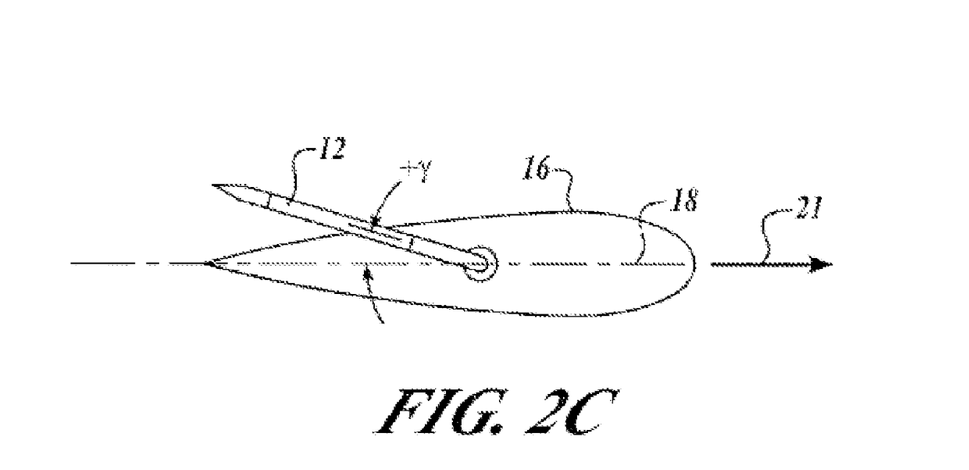

FIG. 1 is a block diagrammatic, partial isometric view of a system 10 for improved rotor tip performance according to an embodiment of the invention. The system 10 includes at least one sail 12 that is coupled to a tip portion 14 of a rotorcraft blade 16 along a chord 18 of the blade 16. The sail 12 is generally aerodynamically configured, which may include a sweep back angle relative to a longitudinal axis 20 of the blade 16. Additionally, the sail 12 may also be cambered, or have a twist imparted along a length of the sail 12. The sail 12 may also be coupled to the tip portion 14 so that the sail 12 is oriented at a positive dihedral angle $\Lambda$ relative to the longitudinal axis 20. Alternately, the sail 12 may be oriented at a negative dihedral angle $\Lambda$, or may be positioned so that there is no dihedral angle between the sail 12 and the longitudinal axis 20. The sail 12 may be coupled to an actuator 22 positioned within the rotorcraft blade 16 that is operable to rotate the sail 12 about a sail rotation axis 24 to position the sail 12 at a predetermined pitch angle $\delta$ relative to the chord 18. With reference now to FIGS. 2(a) through 2(c), the sail 12 is shown oriented at a positive pitch angle $\delta$, a neutral pitch angle $\delta$, and a negative pitch angle $\delta$ relative to the chord 18. For clarity of illustration, the sail 12 as shown in FIGS. 2(a) through 2(c) does not have a dihedral angle $\Lambda$. It is understood, however, that the sail 12 may be oriented relative to the blade 16 so that a dihedral angle $\Lambda$ is present. Further, although the sail 12 is shown in FIG. 2 rotating about an axis located at a mid-chord position to the blade 16, it is understood that the rotational axis may be located at any chord position on the blade 16.

Returning now to FIG. 1, the actuator 22 may be an electromagnetic device, such as an electric servomotor, or a conventional hydraulic or pneumatic actuator. In one particular embodiment, the actuator 22 is comprised of a "smart material" operable to adjustably move the sail 12 to a predetermined angular position while the blade 16 is moved in a direction 21. For example, the "smart material" may comprise a piezoelectric ceramic or polymer operable to rapidly change shape upon the application of an electric field. The "smart material" may also comprise an electrostrictive or magnetostrictive material that effects a change in shape upon the application of an electric or magnetic field to the material, respectively. Further, the "smart material" comprising the actuator 22 may be one of a thermoresponsive material, including shape memory alloys that exhibit pronounced changes in shape upon exposure to a thermal field. In one particular embodiment, the actuator 22 may be comprised of various electroactive polymers that exhibit changes in shape upon the application of an electric field. One example of an electroactive polymer material is disclosed in U.S. Pat. No. 6,545,384 to Pelrine, et al., which patent issued on Apr. 8, 2003 and is incorporated by reference. Suitable electroactive polymers are commercially available from SRI International, Inc. of Menlo Park, Calif., although other suitable alternatives exist.

Still referring to FIG. 1, the actuator 22 is coupled to a control system 28 that is operable to receive at least one input signal 30 from the rotorcraft and process the input signal 30 to generate an output positional signal that is communicated to the actuator 22. The control system 28 may be configured to process the input signal 30 in order to minimize an undesirable effect related to the rotorcraft blade 16. The at least one input signal 30 may comprise, for example, a signal obtained from a structural vibration detection system that employs accelerometers positioned on various selected portions of the rotorcraft structure. Accordingly, the control system 28 generates an output positional signal that minimizes structural vibrations. The input signal 30 may also include, for example, signals obtained from a pitot-static system through an air-data computer, and the control system 28 may be configured to optimize the overall performance of the rotorcraft based upon the airspeed, altitude, or other pertinent flight data. Since the system 10 is expected to significantly enhance the propulsive efficiency of the rotor, thereby decreasing the torque required for a given thrust, the input signal 30 may be further obtained from a torque sensor coupled to the rotor, and the control system 28 may be configured to minimize the rotor torque for a selected flight condition. The control system 28 may also be coupled to other devices. For example, the actuator 22 may include a positional sensing portion (not shown in FIG. 1) that permits the angular position of the sail 12 to be transmitted to the control system 28 to confirm that the sail 12 has moved to the required pitch angle value.

Figure 3:
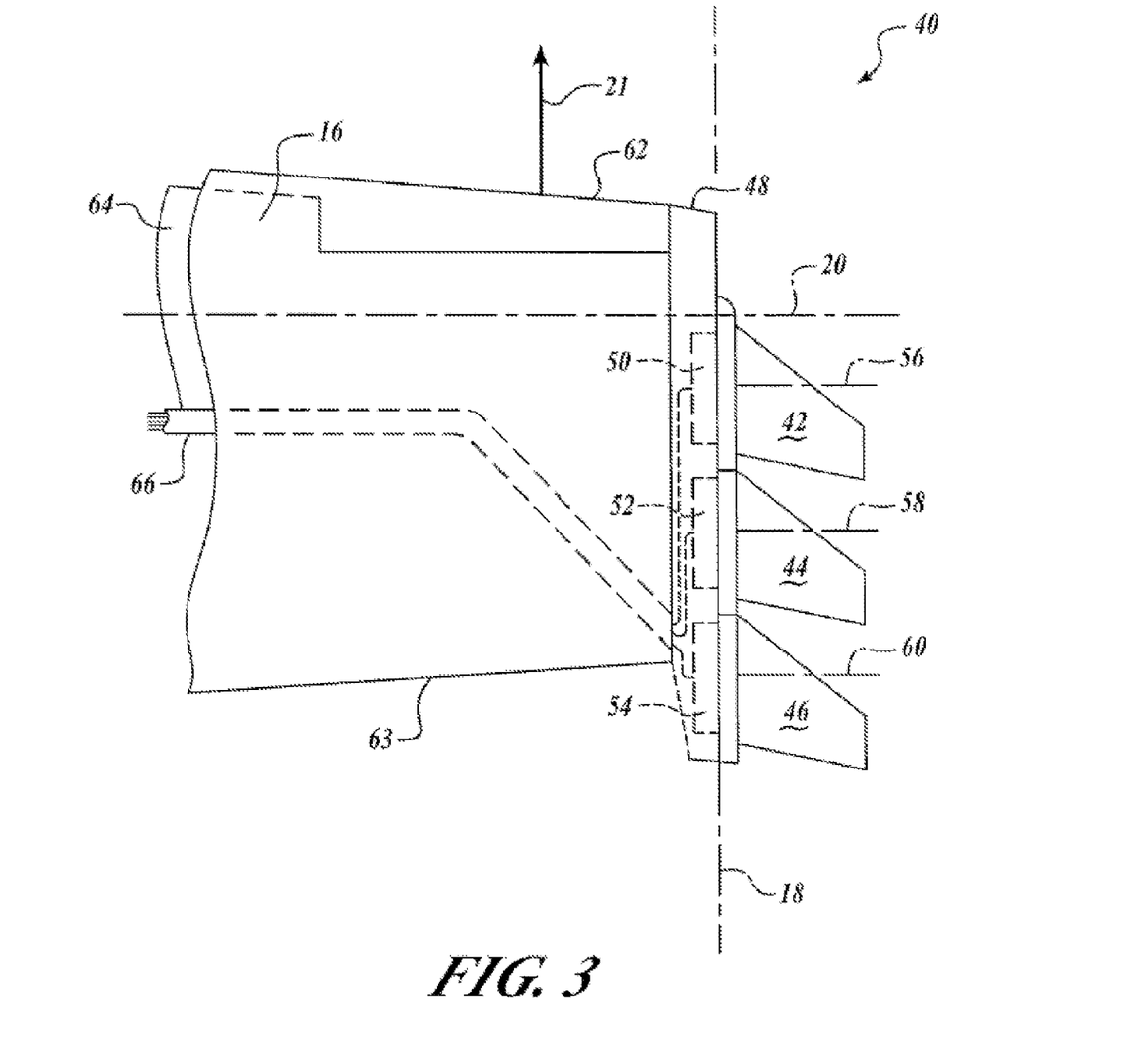
FIG. 3 is a plan view a system for improved rotor tip performance according to another embodiment of the invention.

FIG. 3 is a plan view of a system 40 for improved rotor tip performance according to another embodiment of the invention. In this embodiment, the system 40 includes a forward sail 42, an intermediate sail 44 and an aft sail 46 that are positioned adjacent to a rotor tip 48 and coupled to actuators 50, 52 and 54, respectively. The actuators 50, 52, 54 are configured to independently rotate the forward sail 42, the intermediate sail 44 and the aft sail 46 about the sail rotational axes 56, 58 and 60, respectively. For clarity of illustration, the forward sail 42, the intermediate sail 44 and the aft sail 46 are shown having a similar planform shape, span length and root chord length. It is understood, however, that the sails 42, 44 and 46 may have different planform shapes, span lengths, root chord lengths, or other geometrical variations well known to aeronautical designers, and may be further individually aerodynamically tailored to further optimize the system 40. For example, the forward sail 42, the intermediate sail 44 and the aft sail 46 may include a predetermined camber and/or twist along an axis of the sails 42, 44 and 46. Further, inclination of the forward sail 42, the intermediate sail 44 and the aft sail 46 is not shown in FIG. 3. It is nevertheless understood that the sails 42, 44 and 46 may be inclined relative to the longitudinal axis 20 so that each of the sails 42, 44 and 46 has a different dihedral angle $\Lambda$. Although the system 40 includes three sails, it is understood that, in other embodiments, fewer that three, or alternately, more that three sails may be present. Furthermore, it is understood that in still another particular embodiment, the one or more sails may not be coupled to actuators so that the sails are fixedly positioned on the rotor tip 48.

Still referring to FIG. 3, the forward sail 42, the intermediate sail 44 and the aft sail 46 are advantageously positioned adjacent to the rotor tip 48 at locations that are significantly aft of a leading edge 62 of the blade 16 so that one or more of the sails 42, 44 and 46 may extend beyond a trailing edge 63 of the rotorcraft blade 16 to take advantage of the more favorable air velocities from the tip vortex in that region. The rotor tip 48 is coupled to a flared spar assembly 64 that supports the rotor tip 48 on the blade 16. The flared spar assembly 64 may include an integral wire assembly 66 formed on or within the flared spar assembly 66 in order to fixedly support the wire assembly 66 when the blade 16 is in motion and experiencing high centrifugal forces, particularly near the rotor tip 48. The integral wire assembly 66 couples the forward actuator 50, the intermediate actuator 52 and the aft actuator 54 to the control system 28 (as shown in FIG. 1).

Figure 4A:
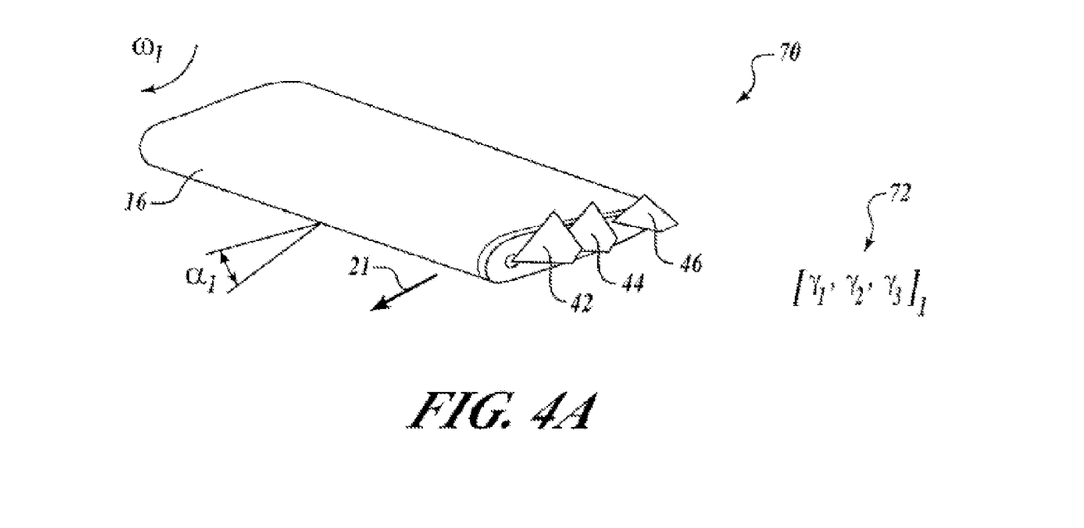
FIGS. 4(a) and 4(b) are partial isometric views of the system of FIG. 3 that is used to describe a method for configuring a rotor blade tip according to still another embodiment of the invention.
Figure 4B:
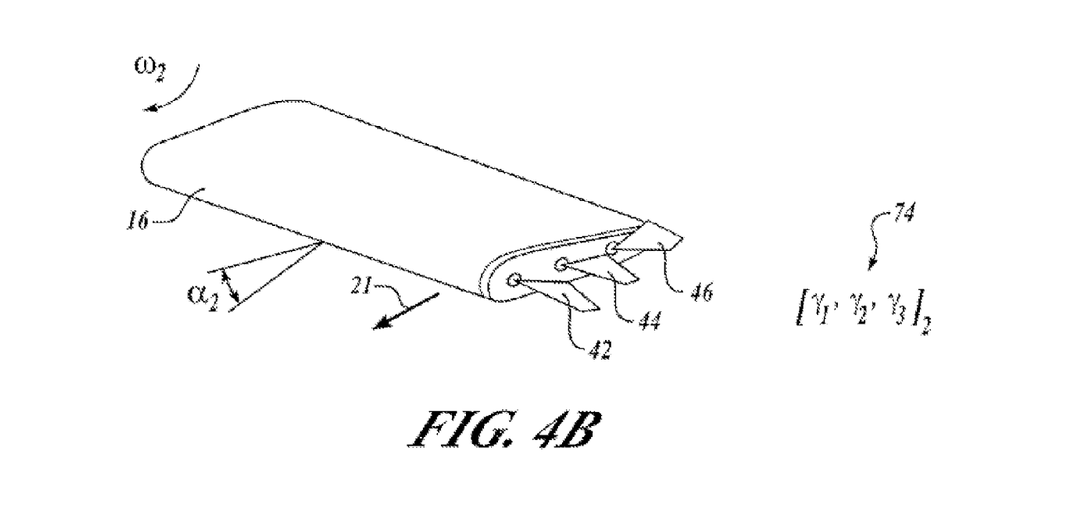

FIGS. 4(a) and 4(b) are partial isometric views of the system 40 of FIG. 3 that will be used to describe a method 70 for configuring a rotor blade tip according to another embodiment of the invention. In general, it is well known that different flight conditions typically encompass a different rotational velocity Ω of the rotorcraft blade 16 (as shown in FIG. 1) and a different angle of attack α for the blade 16. Accordingly, and referring now in particular to FIG. 4(a), the rotorcraft blade 16 is operated at a selected angle of attack α1 and rotational rate Ω1 corresponding to a selected first flight condition. Accordingly, the control system 28 (as shown in FIG. 1) accepts control inputs 30 (also shown in FIG. 1) and generates a first set of pitch angles 72 ([δ1, δ2, δ3]1) The first set of pitch angles 72 may be selected by the control system 28 so that a vibrational level of the rotorcraft is minimized, or a rotor torque of the rotorcraft is minimized for the selected flight condition, or based upon other measured control inputs, as previously described. The first set of pitch angles 72 adjusts the forward sail 42, the intermediate sail 44 and the aft sail 46 as shown in FIG. 4(a), where the forward sail 42, the intermediate sail 44 and the aft sail 46 are each positioned at a different pitch angle. When the rotorcraft has transitioned to a second flight condition so that the rotorcraft blade 16 is operated at a different angle of attack α2 and rotational rate Ω2, as shown in FIG. 4(b), a second set of pitch angles 74 ([δ1, δ2, δ3]2) is generated by the control system 28. Accordingly, the pitch angle of the forward sail 42, the intermediate sail 44 and the aft sail 46 are changed to reflect the second selected flight condition. For example, in the embodiment shown in FIG. 4(b), the forward sail 42 and the intermediate sail 44 have a relatively small pitch angle, while the aft sail 46 has a relatively high pitch angle.

Figure 5:
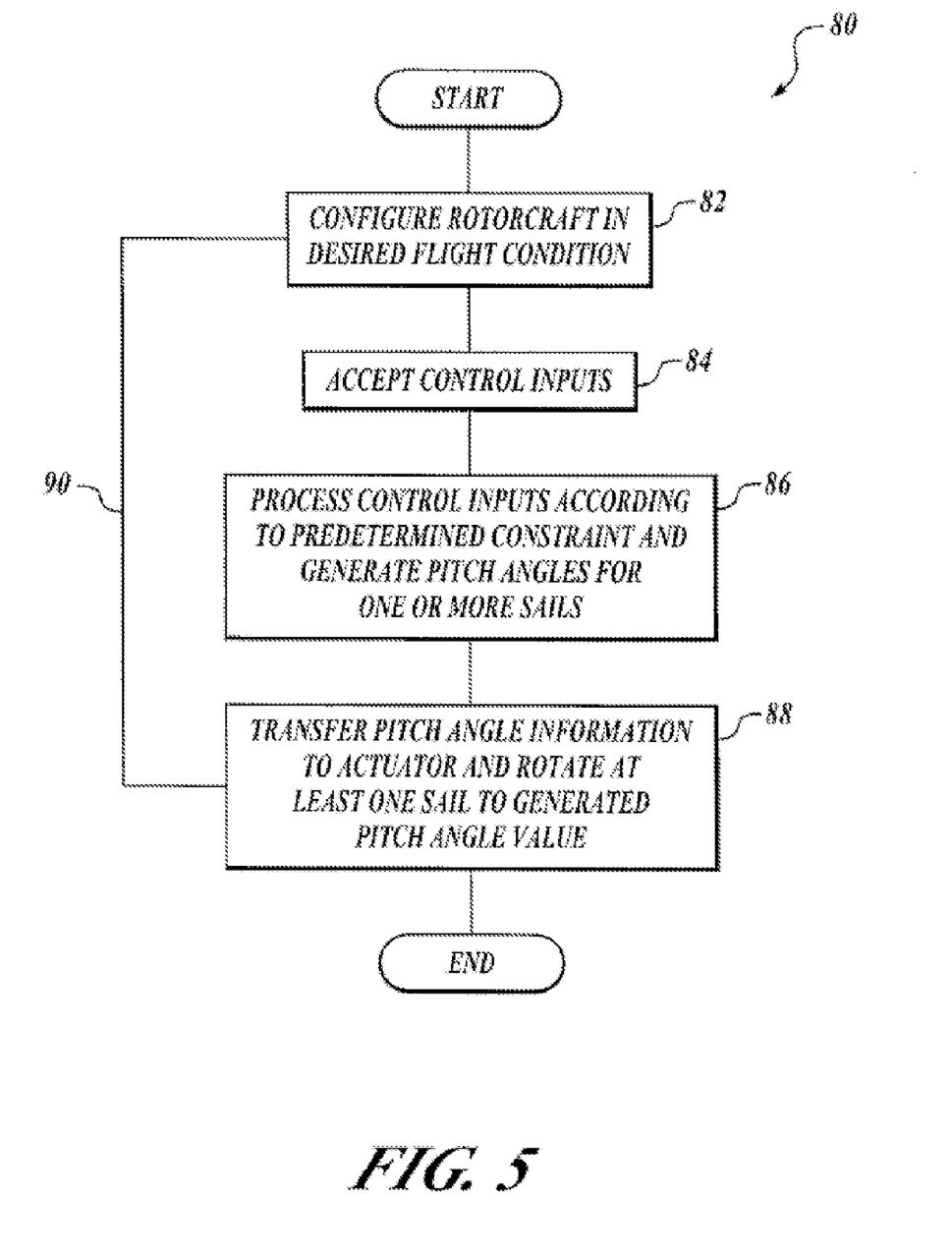
FIG. 5 is a flowchart illustrating a method of operating a rotorcraft, according to still yet another embodiment of the invention.

FIG. 5 is a flowchart illustrating a method 80 of operating a rotorcraft, according to still another embodiment of the invention. At block 82, the rotorcraft is configured in a desired flight condition. For example, the desired flight condition may include a hovering motion, or a maneuvering condition, or still other flight conditions that are well known. At block 84, the control system 28 (as shown in FIG. 1) receives control inputs 30 (also shown in FIG. 1). The control inputs 30 may be generated, for example, by a structural vibration detection system, by a torque measurement device coupled to the rotor, or by a pitot-static system, as previously described. Alternately, the control inputs may be obtained from other systems commonly installed in rotorcraft. At block 86, the control system 28 processes the control inputs 30 according to a constraint condition to generate pitch and/or dihedral angle information. The constraint condition may include minimizing structural vibration or minimizing acoustic emissions while the rotorcraft is configured in the desired flight condition. Alternately, the constraint condition may include reducing the rotor torque while maintaining the desired flight condition. At block 88, the pitch angle information generated at block 86 is transferred to the actuator 22 (as shown in FIG. 1) to move the sail 12 (again as shown in FIG. 1) to the pitch and/or dihedral angle value generated at block 86. The method 80 further includes either returning along a return path 90 to accept new control inputs at block 84, or terminating.

Figure 6A:
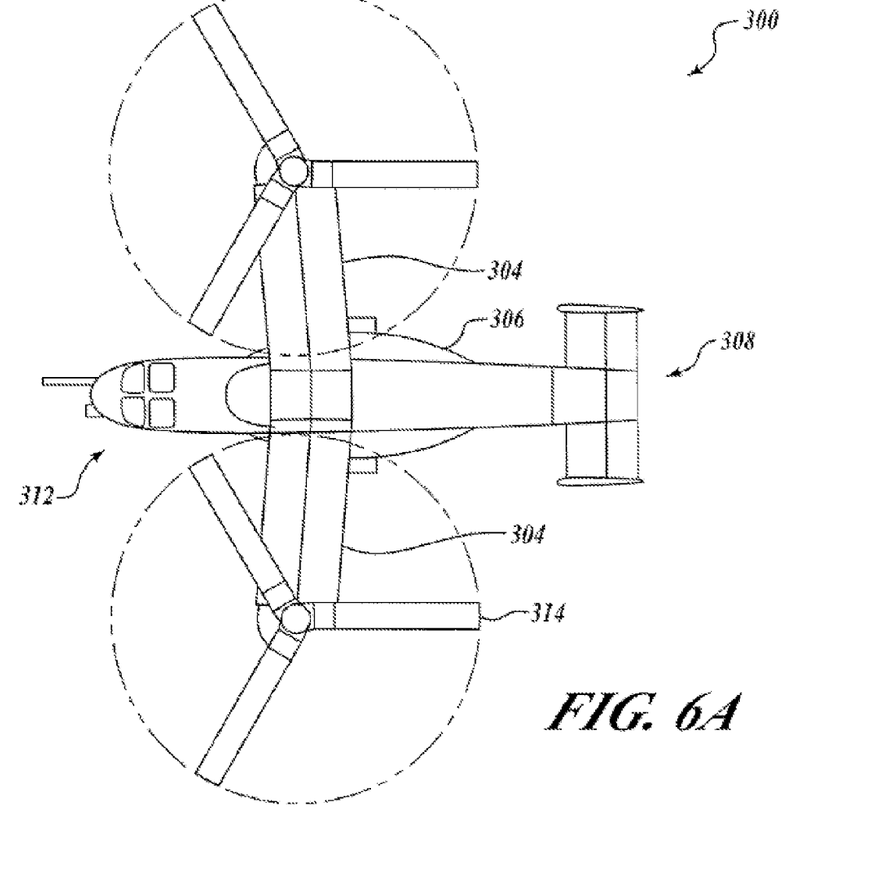
FIG. 6 is a plan view and a side elevation view of a rotary wing aircraft having one or more of the disclosed embodiments of the present invention.
Figure 6B:
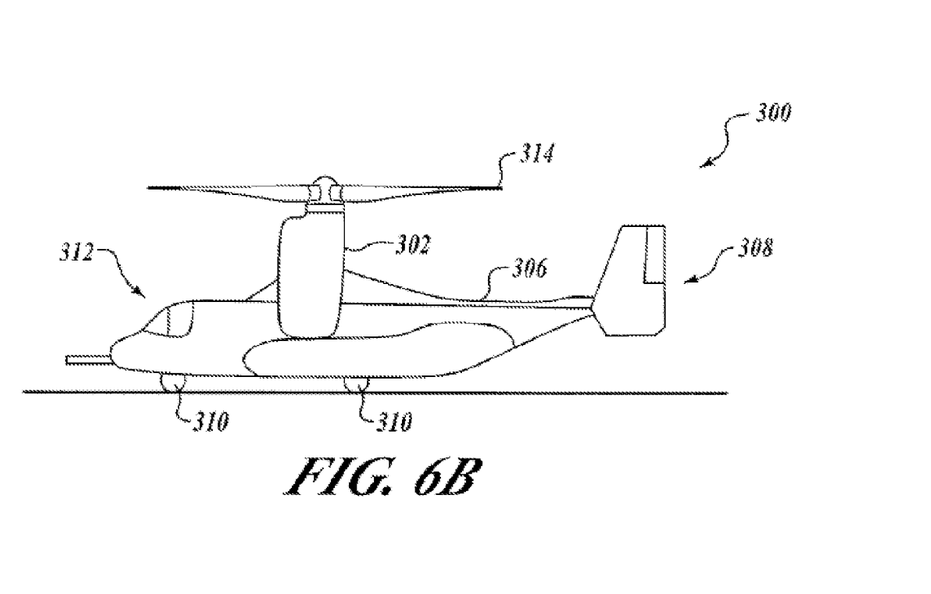

Those skilled in the art will also readily recognize that the foregoing embodiments may be incorporated into a wide variety of different systems. Referring now in particular to FIG. 6, a plan view and a side elevation view of a rotary wing aircraft 300 having one or more of the disclosed embodiments of the present invention is shown. With the exception of the embodiments according to the present invention, the rotary wing aircraft 300 includes components and subsystems generally known in the pertinent art, and in the interest of brevity, will not be described in detail. As shown in FIG. 6, the rotary wing aircraft 300 generally includes one or more propulsion units 302 that may be coupled to wing assemblies 304, or alternately, to a fuselage 306 or even other portions of the rotary wing aircraft 300. Additionally, the rotary wing aircraft 300 also includes a tail assembly 308 and a landing assembly 310 coupled to the fuselage 306. The rotary wing aircraft 300 further includes other systems and subsystems generally required for the proper operation of the rotary wing aircraft 300. For example, the rotary wing aircraft 300 includes a flight control system 312 (not shown in FIG. 5), as well as a plurality of other electrical, mechanical and electromechanical systems that cooperatively perform a variety of tasks necessary for the operation of the rotary wing aircraft 300.

Although the rotary wing aircraft 300 shown in FIG. 6 is representative of a tilt-rotor aircraft, such as the V-22 tilt-rotor aircraft, jointly manufactured by The Boeing Company of Chicago, Ill. and Bell Helicopter Textron of Fort Worth, Tex., it is understood that the various embodiments of the present invention may also be incorporated into rotary wing aircraft that do not possess a tilt-rotor capability, such as a helicopter. Examples of such rotary wing aircraft are illustrated more fully in various descriptive volumes, such as Jane's All The World's Aircraft, available from Jane's Information Group, Ltd. of Coulsdon, Surrey, UK. The rotary wing aircraft 300 may include one or more of the embodiments of the system for improved rotor tip performance 314 according to the present invention, which may operate in association with the various systems and sub-systems of the rotary wing aircraft 300. Although the foregoing discussion has described the various embodiments of the present invention as applied to a rotary wing aircraft, it is understood that the various embodiments may also be incorporated into other flight vehicles. For example, the various disclosed embodiments may be incorporated into a conventional propeller-driven fixed wing aircraft without significant modification.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method for configuring a rotor blade in a rotary wing aircraft, comprising:
   selecting a flight condition;
   configuring the rotor blade to the selected flight condition;
   receiving a control input generated from a sensing device installed in the rotary wing aircraft;
   determining, based on the control input, an orientation of a sail coupled to a tip of the rotor blade, at least a portion of the sail extending beyond an axis that extends along a trailing edge of the rotor blade to an outboard edge of the sail; and
   moving the sail to the determined orientation.

2. The method of claim 1, wherein the selecting the flight condition comprises selecting at least one of a rotor blade pitch angle and a rotor blade rotational velocity associated with the flight condition.

3. The method of claim 1, wherein the moving the sail to the determined orientation comprises rotating the sail about a span-wise axis of the sail.

4. The method of claim 1, wherein the moving the sail to the determined orientation comprises applying a selected field to a smart material that is coupled to the sail and moving the sail in response to the selected field.

5. The method of claim 4, wherein the applying the selected field to the smart material further comprises applying an electric field to at least one of a piezoelectric material, an electrostrictive material, and an electroactive polymer material to move the sail to the determined orientation.

6. The method of claim 4, wherein the applying the selected field to the smart material further comprises applying a magnetic field to a magnetostrictive material to move the sail to the determined orientation.

7. The method of claim 4, wherein the applying the selected field to the smart material further comprises applying a thermal field to a thermoresponsive material to move the sail to the determined orientation.

8. The method of claim 1, wherein the sensing device is one of a structural vibration detection system, a torque measurement device, or a pitot-static system.

9. The method of claim 1, wherein the determining the orientation of the sail includes determining at least one of a sail pitch angle and a sail dihedral angle and further wherein the moving the sail to the determined orientation includes moving the sail to at least one of the sail pitch angle and the sail dihedral angle.

10. The method of claim 1, wherein the determining the orientation of the sail includes determining a sail pitch angle and a sail dihedral angle and further wherein the moving the sail to the determined orientation includes moving the sail to the sail pitch angle and the sail dihedral angle.

11. A method for configuring a rotor blade in a rotary wing aircraft, comprising:
  selecting a flight condition;
  configuring the rotor blade to the selected flight condition;
  receiving a control input generated from a sensing device installed in the rotary wing aircraft;
  determining, based on the control input, an orientation of a sail coupled to a tip of the rotor blade, at least a portion of the sail extending beyond an axis that extends along a trailing edge of the rotor blade to an outboard edge of the sail; and
  applying a selected field to a smart material that is coupled to the sail to move the sail to the determined orientation.

12. The method of claim 11, wherein the applying the selected field to the smart material further comprises applying an electric field to at least one of a piezoelectric material, an electrostrictive material, and an electroactive polymer material to move the sail to the determined orientation.

13. The method of claim 11, wherein the applying the selected field to the smart material further comprises applying a magnetic field to a magnetostrictive material to move the sail to the determined orientation.

14. The method of claim 11, wherein the applying the selected field to the smart material further comprises applying a thermal field to a thermoresponsive material to move the sail to the determined orientation.

15. The method of claim 11, wherein the sensing device is one of a structural vibration detection system, a torque measurement device, or a pitot-static system.

* * * * *